US012799433B2

(12) United States Patent
Lott et al.

(10) Patent No.: US 12,799,433 B2
(45) Date of Patent: Nov. 17, 2026

(54) RESIDUAL URINE NEUTRALIZING COMPOSITIONS AND COATINGS

(71) Applicant: MICROBAN PRODUCTS COMPANY, Huntersville, NC (US)

(72) Inventors: Craig C. Lott, Denver, NC (US); Daniel Bates, Huntersville, NC (US)

(73) Assignee: MICROBAN PRODUCTS COMPANY, Huntersville, NC (US)

( * ) Notice: Subject to any disclaimer, the term of this patent is extended or adjusted under 35 U.S.C. 154(b) by 0 days.

(21) Appl. No.: 19/435,981

(22) Filed: Dec. 30, 2025

(65) Prior Publication Data

US 2026/0159781 A1    Jun. 11, 2026

(51) Int. Cl.

| | |
|---|---|
| ***C11D 3/37*** | (2006.01) |
| ***C11D 1/02*** | (2006.01) |
| ***C11D 1/66*** | (2006.01) |
| ***C11D 1/86*** | (2006.01) |
| ***C11D 3/00*** | (2006.01) |

(Continued)

(52) U.S. Cl.

CPC ................ *C11D 3/381* (2013.01); *C11D 1/02* (2013.01); *C11D 1/66* (2013.01); *C11D 1/86* (2013.01); *C11D 3/0036* (2013.01); *C11D 3/0068* (2013.01); *C11D 3/2093* (2013.01); *C11D 3/373* (2013.01); *C11D 3/3757* (2013.01);

(Continued)

(58) Field of Classification Search

CPC .... C11D 1/02; C11D 1/66; C11D 1/86; C11D 3/2093; C11D 3/3757; C11D 3/3765; C11D 3/381; C11D 3/38618; C11D 3/38627

USPC ....... 510/191, 238, 320, 321, 392, 393, 421, 510/466, 475, 477, 488, 505, 506

See application file for complete search history.

(56) References Cited

U.S. PATENT DOCUMENTS

| | | | | |
|---|---|---|---|---|
| 5,792,278 A * | 8/1998 | Wojcik | .................. | B41N 3/006 134/40 |
| 6,242,388 B1 * | 6/2001 | Sharma | ................. | C09K 8/524 134/40 |

(Continued)

FOREIGN PATENT DOCUMENTS

| | | |
|---|---|---|
| EP | 2747790 B1 | 4/2019 |
| GB | 2362814 A | 12/2001 |

(Continued)

OTHER PUBLICATIONS

Dutch Search Report and Written Opinion for Dutch Application No. 2039406; Aug. 13, 2025; 11 pages.

(Continued)

*Primary Examiner* — Gregory R Delcotto

(74) *Attorney, Agent, or Firm* — Shumaker, Loop & Kendrick, LLP

(57) ABSTRACT

A liquid composition that forms a residual hydrophobic coating on a substrate post-application that neutralizes urine odor and/or degrades urine including water, microbial spore (s) and an enzyme dispersed within the water present in an effective amount to reduce and/or eliminate urine odor and/or degrade urine on the substrate post-application; and a film forming composition dispersed within the water present in an effective amount to form a clear hydrophobic film on the substrate post-application. A residual hydrophobic coating formed on a substrate that neutralizes urine odor and/or degrades urine for a predetermined period of time.

26 Claims, 7 Drawing Sheets

(51) Int. Cl.

| | |
|---|---|
| ***C11D 3/20*** | (2006.01) |
| ***C11D 3/38*** | (2006.01) |
| ***C11D 3/386*** | (2006.01) |

(52) U.S. Cl.

CPC ........ *C11D 3/3765* (2013.01); *C11D 3/38618* (2013.01); *C11D 3/38627* (2013.01)

(56) References Cited

U.S. PATENT DOCUMENTS

| | | | | |
|---|---|---|---|---|
| 6,593,279 | B2 * | 7/2003 | Von Krosigk ........... | C09K 8/52<br>507/261 |
| 7,314,748 | B1 | 1/2008 | Fredenburgh et al. | |
| 2006/0247150 | A1 * | 11/2006 | Molinaro ............... | C11D 3/046<br>510/499 |
| 2007/0054818 | A1 | 3/2007 | Li et al. | |
| 2008/0287331 | A1 * | 11/2008 | Lin ........................ | C11D 3/201<br>510/174 |
| 2011/0028925 | A1 | 2/2011 | Numano et al. | |
| 2012/0269759 | A1 | 10/2012 | Pliszka | |
| 2016/0115326 | A1 | 4/2016 | Ueda et al. | |
| 2018/0282947 | A1 | 10/2018 | Mattingly et al. | |
| 2020/0299521 | A1 | 9/2020 | McDaniel | |
| 2021/0009922 | A1 | 1/2021 | Klingman et al. | |
| 2021/0238391 | A1 | 8/2021 | McDaniel | |

FOREIGN PATENT DOCUMENTS

| | | | | | |
|---|---|---|---|---|---|
| JP | H07207248 | A | | 8/1995 | |
| WO | 03056096 | A1 | | 7/2003 | |
| WO | 03064755 | A2 | | 8/2003 | |
| WO | WO-2005040320 | A2 | * | 5/2005 | ............. C11D 3/381 |
| WO | WO-2014107111 | A1 | * | 7/2014 | ............... C11D 7/40 |
| WO | WO-2017157772 | A1 | * | 9/2017 | ........... C11D 3/0068 |
| WO | WO-2017157775 | A1 | * | 9/2017 | ............. C12N 1/205 |
| WO | WO-2017157778 | A1 | * | 9/2017 | ............ A61L 9/013 |
| WO | 2020180750 | A1 | | 9/2020 | |
| WO | WO-2022126232 | A1 | * | 6/2022 | ............. C11D 17/06 |
| WO | WO-2024193960 | A1 | * | 9/2024 | .............. A01P 17/00 |
| WO | WO-2025073469 | A1 | * | 4/2025 | ............... C11D 1/37 |

OTHER PUBLICATIONS

International Search Report and Written Opinion for International Patent App. No. PCT/US2025/059117; date mailed Apr. 22, 2026; 23 pages.

1 Restriction Requirement from U.S. Appl. No. 19/435,987; dated Mar. 27, 2026; 47 pages.

Non-Final Office Action (NFOA) from U.S. Appl. No. 19/435,987; dated Jun. 17, 2026; 26 pages.

Dorfan et al.; "The Utilization of Bacillus subtilis to design environmentally friendly living paints with anti-mold properties," 2024, MDPI, Microorganisms, vol. 12, Article 1226, pp. 1-13.

Flickinger et al.; "Painting and printing living bacteria: engineering nanoporous biocatalytic coatings to preserve microbial viability and intensify reactivity," 2007, ACS; Biotechnology Progress, vol. 23, No. 1, pp. 2-17.

Friel et al.; "Acrylic polymers as coating binders," 2012, ASTM International, Paint and Coating Testing Manual 15th ed., Chapter 6, pp. 49-64.

* cited by examiner

RESIDUAL URINE NEUTRALIZING COMPOSITIONS AND COATINGS

TECHNICAL FIELD

The present invention relates generally to the field of liquid compositions and coatings formed therefrom, and more particularly, to liquid compositions and coatings that neutralizes urine odor and/or degrades urine.

BACKGROUND

Public spaces, such as public bathrooms and high touch surfaces, are hard to maintain often-times associated with extraneous urines splashes, lingering malodors, etc. These public spaces require constant cleaning and disinfection in an attempt to maintain a cleanly appearance.

Many conventional products either mask or temporarily eliminate various smells in bathrooms to keep these spaces smelling fresh for a short amount of time. However, the malodors quickly return requiring frequent and repeated cleaning. The frequent reapplication of these products disadvantageously requires frequent, excessive use of cleaning products coupled with frequent manual labor to reapply these cleaning products, thus resulting in a very costly, inefficient endeavor.

WO03064755 discloses an aqueous composition and method for controlling odor associated with spills of organic material on carpets. WO03056096 and U.S. Pat. No. 7,314,748 disclose an aqueous composition and method for controlling odor associated with spills of organic material on carpets. The composition may contain additional components such as anti-foaming agents or masking agents. JPH07207248 discloses oil-based gel films that act as coating agents for toilet stools. EP2747790 discloses concentrated bio-enzymatic cleaners which require further dilution. US2020299521 discloses peptide-containing coating compositions for reducing microbial growth.

SUMMARY

In view of the above-mentioned problems associated with lingering odors, extraneous urines splashes, etc., there is a need to provide compositions and coatings (residual coatings) that maintain bathroom cleanliness and bathroom surface cleanliness as well as providing a fresh smell and/or reduced odor within bathroom spaces for prolonged periods of time especially when compared to conventional cleaning products. The coatings disclosed herein are further advantageously capable of withstanding routine cleaning practices while concurrently maintaining odor neutralizing and/or odor degrading properties, which includes but is not limited to neutralizing urine odor and/or degrading urine on, for example, bathroom surfaces. The disclosed compositions and/or coatings comprise an acrylic homopolymer with a higher Tg than the compositions discussed in WO03064755, WO03056096, U.S. Pat. No. 7,314,748, JPH07207248, EP2747790, and US2020299521. The disclosed compositions and/or coatings are designed for hard surfaces such as porcelain tile, ceramic tile, and/or any hard surface found in a bathroom. The disclosed compositions and/or coatings comprise a coalescing agent that aids in film formation producing a coating with increased durability against water-based staining, as well as abrasion resistance. The coalescing agent produces a homogeneous and/or uniform film on the surface of the substrate. The disclosed compositions and/or coatings are ready-to-use formulations as opposed to a concentrate that requires dilution. The disclosed compositions and/or coatings are not flexible enough to go on a fibrous material such as carpet due to the high Tg of the coatings.

In certain aspects, disclosed is a liquid composition that forms a residual hydrophobic coating on a substrate post-application that neutralizes urine odor and/or degrades urine when the residual hydrophobic coating is contacted with urine comprising: (a) water at a concentration of up to 80 wt % of the liquid composition; (b) microbial spore(s) and an enzyme dispersed, preferably homogeneously dispersed, within the water present in an effective amount, preferably at least 10 wt %, to reduce and/or eliminate urine odor and/or degrade urine on the substrate post-application; and (c) a film forming composition dispersed, preferably homogeneously dispersed, within the water present in an effective amount, preferably at least 8 wt %, to form a clear hydrophobic film on the substrate post-application. With effective amount in the present description is meant an amount that is effective to provide the stated effect; a skilled person is able to determine what is the effective amount. Examples of preferred amounts are provided, however these are not to be considered limiting as a skilled person may determine the effect amount.

In certain aspects, the liquid composition has pH ranging from 5.0 to 9.8 as well as a viscosity ranging from 5 cPs to 100 cPs, such as a viscosity ranging from 25 cPs to 100 cPs, for example from 35 cPs to 100 cPs, measured at a temperature of 25° C. according to ASTM D2196.

In certain aspects, the liquid composition further comprising a coalescing agent present in an effective amount, preferably at least 0.15 wt %, to lower Tg of the film forming composition to facilitate film formation post-application of the liquid composition on the substrate at ambient temperature. With ambient temperature in the present description is meant a temperature between 20 and 25 degrees Celsius (20° C. to 25° C.).

In certain aspects, the coalescing agent is an ester alcohol, a glycol ester, or a combination thereof.

In certain aspects, the coalescing agent is 2,2,4-Trimethyl-1,3-pentanediol-iso-butyrate.

In certain aspects, the coalescing agent has a concentration ranging from 0.15 wt % to 1.0 wt %, more preferably from 0.25 wt % to 0.95 wt % of an overall concentration of the liquid composition.

In certain aspects, the film forming composition is configured to adhere to the substrate and/or is configured to adhere the microbial spore(s) and the enzyme to the substrate.

In certain aspects, the film forming composition is anionic, non-ionic, or a combination thereof and/or wherein the film forming composition comprises 8 wt % to 40 wt %, more preferably 10 wt % to 35 wt % of the overall concentration of the liquid composition.

In certain aspects, the film forming composition comprises an anionic or non-ionic acrylate, an anionic or non-ionic silicon compound, or a combination thereof.

In certain aspects, the anionic or non-ionic acrylate is an acrylic homopolymer.

In certain aspects, the anionic or non-ionic acrylate is present in the liquid composition at a concentration ranging from 7.5 wt % to 37 wt %, more preferably 9.75 wt % to 33.5 wt % of the overall concentration of the liquid composition.

In certain aspects, the film forming composition comprises the anionic acrylate.

In certain aspects, the anionic acrylate is an anionic acrylic homopolymer.

In certain aspects, the anionic acrylate is present in the liquid composition at a concentration ranging from 7.5 wt % to 37 wt %, more preferably 9.75 wt % to 33.5 wt % of the overall concentration of the liquid composition.

In certain aspects, the film forming composition comprises an anionic or non-ionic silicon compound.

In certain aspects, the anionic or non-ionic silicon compound is an organosilicon compound.

In certain aspects, the organosilicon compound is a non-ionic organosilicon compound.

In certain aspects, the anionic or non-ionic silicon compound is present in the liquid composition at a concentration ranging from 0.1 wt % to 3 wt %, more preferably 0.125 wt % to 2 wt % of the overall concentration of the liquid composition.

In certain aspects, the film forming composition comprises the anionic or non-ionic acrylate and the anionic or non-ionic silicon compound present in the liquid composition at ratio of 5:1 to 14:1, more preferably 4:1 to 7:1 relative to one another.

In certain aspects, the film forming composition comprises the anionic acrylate and the anionic silicon compound present in the liquid composition at ratio of 5:1 to 14:1, more preferably 4:1 to 7:1 relative to one another.

In certain aspects, the film forming composition comprises the anionic acrylate and the non-ionic silicon compound present in the liquid composition at ratio of 5:1 to 14:1, more preferably 4:1 to 7:1 relative to one another.

In certain aspects, the film forming composition comprises the non-ionic acrylate and the non-ionic silicon compound present in the liquid composition at ratio of 5:1 to 14:1, more preferably 4:1 to 7:1 relative to one another.

In certain aspects, the microbial spore(s) are gram positive bacterial spores and/or non-pathogenic and/or are *Bacillus* spores and/or are *Bacillus subtilis* spores that degrade urine.

In certain aspects, the microbial spore(s) are present at a concentration of $2.5\times10^7$ to $7.5\times10^7$, more preferably $3\times10^7$ to $6.75\times10^7$ cfu/mL in the liquid composition.

In certain aspects, the enzyme is an anionic enzyme.

In certain aspects, the enzyme is a lipase present at an effective amount, preferably at least 0.075 wt %, to degrade urine and/or lipids within urine.

In certain aspects, the enzyme has a concentration ranging from 0.075 wt % to 0.25 wt %, more preferably 0.1 wt % to 0.22 wt % of the overall concentration of the liquid composition.

In certain aspects, the microbial spore(s) and the enzyme comprise 10 wt % to 28 wt % of an overall weight of liquid composition.

Also disclosed is a residual hydrophobic coating formed on a substrate post-application of the liquid composition to the substrate, wherein the residual hydrophobic coating neutralizes urine odor and/or degrades urine for a predetermined period of time.

Also disclosed is a residual hydrophobic coating that neutralizes urine odor and/or degrades urine comprising: (a) microbial spore(s) and an enzyme present in an effective amount, preferably at least 42.0 wt %, to reduce and/or eliminate urine odor and/or degrade urine when the residual hydrophobic coating is contacted with urine; and a clear film having the microbial spore(s) and the enzyme composition dispersed, preferably homogeneously dispersed, therein.

In certain aspects, the residual hydrophobic coating is covalently bound, electrostatically bound, or adhered by physical interaction(s) to the substrate.

In certain aspects, the clear film is anionic, non-ionic, or a combination thereof.

In certain aspects, the clear film comprises 15.0 wt % to 60 wt %, more preferably 15.5 wt % to 55 wt % of an overall concentration of the residual hydrophobic coating.

In certain aspects, the clear film comprises an anionic or non-ionic acrylate, an anionic or non-ionic silicon compound, or a combination thereof.

In certain aspects, the anionic or non-ionic acrylate is an acrylic homopolymer.

In certain aspects, the anionic or non-ionic acrylate is at a concentration ranging from 12.5 wt % to 55.0 wt % of the overall concentration of the residual hydrophobic coating.

In certain aspects, the clear film comprises the anionic acrylate.

In certain aspects, the anionic acrylate is an anionic acrylic homopolymer.

In certain aspects, the anionic acrylate is present at a concentration ranging from 12.5 wt % to 55.0 wt % of the overall concentration of the residual hydrophobic coating.

In certain aspects, the clear film composition comprises an anionic or non-ionic silicon compound.

In certain aspects, the anionic or non-ionic silicon compound is an organosilicon compound.

In certain aspects, the organosilicon compound is a non-ionic organosilicon compound.

In certain aspects, the anionic or non-ionic silicon compound is present at a concentration ranging from 0.4 wt % to 5.0 wt % of the overall concentration of the residual hydrophobic coating.

In certain aspects, the clear film comprises the anionic or non-ionic acrylate and the anionic or non-ionic silicon compound present in the residual hydrophobic coating at ratio of 5:1 to 14:1, more preferably 4:1 to 7:1 relative to one another.

In certain aspects, the clear film comprises the anionic acrylate and the anionic silicon compound present in the residual hydrophobic coating at ratio of 5:1 to 14:1, more preferably 4:1 to 7:1 relative to one another.

In certain aspects, the clear film comprises the anionic acrylate and the non-ionic silicon compound present in the residual hydrophobic coating at ratio of 5:1 to 14:1, more preferably 4:1 to 7:1 relative to one another.

In certain aspects, the clear film comprises the non-ionic acrylate and the non-ionic silicon compound present in the residual hydrophobic coating at ratio of 5:1 to 14:1, more preferably 4:1 to 7:1 relative to one another.

In certain aspects, the microbial spore(s) are *Bacillus* spores that degrade urine.

In certain aspects, the microbial spore(s) are present at a concentration of $2.5\times10^7$ to $7.5\times10^7$, more preferably $3\times10^7$ to $6.75\times10^7$ cfu/mL in the residual hydrophobic coating.

In certain aspects, the enzyme is an anionic enzyme.

In certain aspects, the enzyme is a lipase present at an effective amount, preferably at least 0.5 wt %, to degrade urine and/or lipids within urine.

In certain aspects, the enzyme has a concentration ranging from 0.5 wt % to 5.0 wt % of the overall concentration of the residual hydrophobic coating.

In certain aspects, the enzyme has a concentration more preferably ranging from 0.5 wt % to 4.5 wt % of the overall concentration of the residual hydrophobic coating.

In certain aspects, the microbial spore(s) and the enzyme comprise 42.0 wt % to 83 wt % of an overall weight of the residual hydrophobic coating.

Also disclosed is an article comprising: (a) a substrate; and (b) a residual hydrophobic coating that neutralizes urine odor and/or degrades urine on the substrate.

In certain aspects, wherein the substrate is a rigid substrate, a non-porous substrate, or a combination thereof.

In certain aspects, wherein the substrate is glass, ceramic, metal, plastic, cementitious fillers (e.g., grout), elastomer(s) (e.g., elastomeric caulk), or any combination thereof.

Also disclosed is a method of making the liquid composition comprising dispersing microbial spore(s), enzyme, and a film forming composition in water and optionally dispersing a coalescing agent therein thereby forming the liquid composition.

Also disclosed is a method comprising applying the liquid composition to a substrate and forming a residual hydrophobic coating on the substrate post-application of the liquid composition, wherein the residual hydrophobic coating neutralizes urine odor and/or degrades urine when contacted with urine.

Also disclosed is a liquid composition that forms a residual hydrophobic coating on a substrate post-application that neutralizes urine odor and/or degrades urine when the residual hydrophobic coating is contacted with urine comprising: (a) water at a concentration of up to 80 wt % of the liquid composition; (b) microbial spore(s) and an enzyme dispersed, preferably homogeneously dispersed, within the water present in an effective amount, preferably at least 10 wt %, to reduce and/or eliminate urine odor and/or degrade urine on the substrate post-application; (c) a film forming composition dispersed, preferably homogeneously dispersed, within the water present in an effective amount, preferably at least 8 wt %, to form a clear hydrophobic film on the substrate post-application; and (d) a coalescing agent present in an effective amount, preferably at least 0.15 wt %, to lower Tg of the film forming composition to facilitate film formation post-application of the liquid composition on the substrate at ambient temperature. With ambient temperature in the present description is meant a temperature between 20 and 25 degrees Celsius (20° C. to 25° C.). With effective amount in the present description is meant an amount that is effective to provide the stated effect; a skilled person is able to determine what is the effective amount. Examples of preferred amounts are provided, however these are not to be considered limiting as a skilled person may determine the effect amount.

In certain aspects, the liquid composition has pH ranging from 5.0 to 9.8 as well as a viscosity ranging from 5 cPs to 100 cPs, such as a viscosity ranging from 25 cPs to 100 cPs, for example from 35 cPs to 100 cPs, measured at a temperature of 25° C. according to ASTM D2196.

In certain aspects, the coalescing agent is an ester alcohol, a glycol ester, or a combination thereof.

In certain aspects, the coalescing agent is 2,2,4-Trimethyl-1,3-pentanediol-iso-butyrate.

In certain aspects, the coalescing agent has a concentration ranging from 0.15 wt % to 1.0 wt %, more preferably from 0.25 wt % to 0.95 wt % of an overall concentration of the liquid composition.

In certain aspects, the film forming composition is configured to adhere to the substrate and/or is configured to adhere the microbial spore(s) and the enzyme to the substrate.

In certain aspects, the film forming composition is anionic, non-ionic, or a combination thereof and/or wherein the film forming composition comprises 8 wt % to 40 wt %, more preferably 10 wt % to 35 wt % of the overall concentration of the liquid composition.

In certain aspects, the film forming composition comprises an anionic or non-ionic acrylate, an anionic or non-ionic silicon compound, or a combination thereof.

In certain aspects, the anionic or non-ionic acrylate is an acrylic homopolymer.

In certain aspects, the anionic or non-ionic acrylate is present in the liquid composition at a concentration ranging from 7.5 wt % to 37 wt %, more preferably 9.75 wt % to 33.5 wt % of the overall concentration of the liquid composition.

In certain aspects, the film forming composition comprises the anionic acrylate.

In certain aspects, the anionic acrylate is an anionic acrylic homopolymer.

In certain aspects, the anionic acrylate is present in the liquid composition at a concentration ranging from 7.5 wt % to 37 wt %, more preferably 9.75 wt % to 33.5 wt % of the overall concentration of the liquid composition.

In certain aspects, the film forming composition comprises an anionic or non-ionic silicon compound.

In certain aspects, the anionic or non-ionic silicon compound is an organosilicon compound.

In certain aspects, the organosilicon compound is a non-ionic organosilicon compound.

In certain aspects, the anionic or non-ionic silicon compound is present in the liquid composition at a concentration ranging from 0.1 wt % to 3 wt %, more preferably 0.125 wt % to 2 wt % of the overall concentration of the liquid composition.

In certain aspects, the film forming composition comprises the anionic or non-ionic acrylate and the anionic or non-ionic silicon compound present in the liquid composition at ratio of 5:1 to 14:1, more preferably 4:1 to 7:1 relative to one another.

In certain aspects, the film forming composition comprises the anionic acrylate and the anionic silicon compound present in the liquid composition at ratio of 5:1 to 14:1, more preferably 4:1 to 7:1 relative to one another.

In certain aspects, the film forming composition comprises the anionic acrylate and the non-ionic silicon compound present in the liquid composition at ratio of 5:1 to 14:1, more preferably 4:1 to 7:1 relative to one another.

In certain aspects, the film forming composition comprises the non-ionic acrylate and the non-ionic silicon compound present in the liquid composition at ratio of 5:1 to 14:1, more preferably 4:1 to 7:1 relative to one another.

In certain aspects, the microbial spore(s) are gram positive bacterial spores and/or non-pathogenic and/or are *Bacillus* spores and/or are *Bacillus subtilis* spores that degrade urine.

In certain aspects, the microbial spore(s) are present at a concentration of $2.5\times10^7$ to $7.5\times10^7$, more preferably $3\times10^7$ to $6.75\times10^7$ cfu/mL in the liquid composition.

In certain aspects, the enzyme is an anionic enzyme.

In certain aspects, the enzyme is a lipase present at an effective amount, preferably at least 0.075 wt %, to degrade urine and/or lipids within urine.

In certain aspects, the enzyme has a concentration ranging from 0.075 wt % to 0.25 wt %, more preferably 0.1 wt % to 0.22 wt % of the overall concentration of the liquid composition.

In certain aspects, the microbial spore(s) and the enzyme comprise 10 wt % to 28 wt % of an overall weight of liquid composition.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed. The accompanying drawings are included to provide a further understanding of the invention and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 3B shows the appearance of the liquid composition (post-drying/post-curing thereon) after addition of water to the surface of the substrate. FIG. 4B shows the appearance of the liquid composition (post-drying/post-curing thereon) after addition of water to the surface of the substrate.

FIG. 5B shows the appearance of the liquid composition (post-drying/post-curing thereon) after addition of water to the surface of the substrate.

FIG. 6B shows the appearance of the liquid composition (post-drying/post-curing thereon) after addition of water to the surface of the substrate.

FIG. 7B shows the appearance of the liquid composition (post-drying/post-curing thereon) after addition of water to the surface of the substrate.

DETAILED DESCRIPTION

Figure 1:
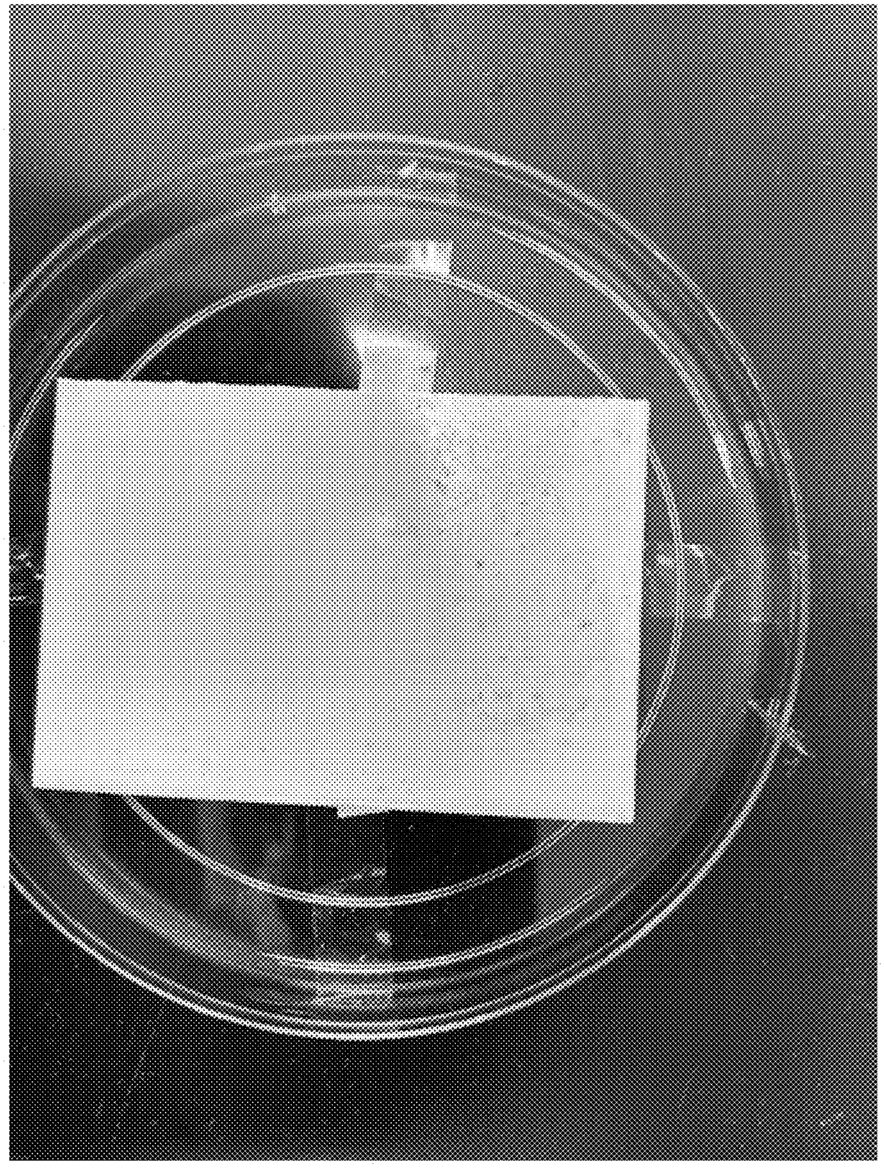
FIG. 1 is a photograph of a porcelain substrate soiled with urine.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Liquid Composition that Forms the Residual Hydrophobic Coating on a Substrate Post-Application Disclosed is a liquid composition that forms a residual hydrophobic coating on a substrate post-application that neutralizes urine odor (human urine odor) and/or degrades urine (human urine) when the residual hydrophobic coating is contacted with urine (e.g., human urine). The liquid compositions includes (a) water at a concentration of up to 80 wt % of the liquid composition; (b) microbial spore(s) and an enzyme dispersed, preferably homogeneously dispersed, within the water present in an effective amount to reduce and/or eliminate urine odor and/or degrade urine on the substrate post-application; and (c) a film forming composition dispersed, preferably homogeneously dispersed, within the water present in an effective amount to form a clear hydrophobic film on the substrate post-application. In certain aspects, water is included within the liquid composition at a concentration of 45 wt % to 80 wt %, more preferably 50 wt % to 80 wt %, even more preferably 55 wt % to 80 wt % of the overall concentration of the liquid composition, in which any endpoint within these ranges can serve as endpoints for any additional sub-range falling therein.

The liquid composition has a pH ranging from 5.0 to 9.8, more preferably 7.0 to 9.8 in which any endpoint within these ranges can serve as endpoints for any additional sub-range falling therein as well as a viscosity of 5 cPs to 100 cPs, such as a viscosity ranging from 25 cPs to 100 cPs, for example from 35 cPs to 100 cPs measured by ASTM D2196 at a temperature of 20 and 25 degrees Celsius (20° C. to 25° C.) in which any endpoint within these ranges can serve as endpoints for any additional sub-range falling therein so that the liquid composition may be adequately and/or evenly (e.g., uniformly and/or homogeneously)

applied to a substrate and/or so that, for example, the microbial spore(s) and/or enzyme maintains desired activity/operability both while in storage (e.g., shelf-life) and/or during and/or post-application to the substrate. As opposed to point-of-use compositions that are used immediately after production on-site, it should be understood that the disclosed liquid compositions should be shelf-stable and/or exhibit desired storage stability for a predetermined period of time, which includes six (6) months to five (5) years in which the microbial spore(s) and/or enzymes included within the liquid composition maintain, for example, at least 80%, at least 85%, at least 90%, at least 95%, at least 98%, or at least 99% of the properties and/or efficacy disclosed herein during this predetermined period of time, thus avoiding the need of immediate application immediately after the liquid composition is manufactured/made.

As alluded to above, the liquid composition disclosed herein preferably includes a blend/mixture of microbial spore(s) and an enzyme dispersed, preferably homogeneously dispersed, within the water at an effective amount to reduce and/or eliminate urine odor and/or degrade urine on a substrate post-application (and, for example, post-cure/post-drying). The microbial spore(s) and/or enzymes degrade urine and/or neutralize the smells associated with urine (human urine) and/or the by-products thereof (e.g., ammonia and/or bicarbonate) and/or additional substances (e.g., lipids and/or proteins) found within and/or excreted with urine.

The microbial spore(s) disclosed herein are preferably gram-positive bacterial spore and/or non-pathogenic microbial spores, more preferably *Bacillus* spores and even more preferably *Bacillus subtilis* spores that degrade urine. In certain aspects, the non-pathogenic microbial spores, more preferably *Bacillus* spores, more preferably *Bacillus subtilis* are non-genetically modified spores while in other aspects the *Bacillus* spores are genetically modified with transgenes that advantageously degrade urine and/or neutralize the smells associated with urine and/or the by-products (ammonia and/or bicarbonate) thereof and/or additional substances (e.g., lipids and/or proteins) found within and/or excreted with urine. The microbial spore(s), and more particularly, *Bacillus* spores, are present at a concentration of $2.5\times10^7$ to $7.5\times10^7$, more preferably $3\times10^7$ to $6.75\times10^7$ cfu/mL in which any endpoint within these ranges can serve as endpoints for any additional sub-range falling therein in the liquid composition to advantageously achieve the desired urine degradation and/or neutralization and/or by-product degradation/neutralization (ammonia and/or bicarbonate) and/or degradation/neutralization of additional substances (e.g., lipids and/or proteins) post-application and post-drying/post-cure of the liquid composition to the substrate for a desired period of time.

The enzyme included within the liquid composition preferably degrades lipids (fats) and/or proteins typically found in urine (human urine) and is included within the liquid composition at effective amounts/concentrations to do so. In certain aspects, the enzyme is an anionic enzyme in order to interact with other components in the liquid composition and to maintain efficacy both within the liquid composition and post-application of the liquid composition onto a substrate. The enzyme is preferably a lipase (more preferably a bacterial lipase or a lipase produced by (and/or isolated from) bacterial fermentation processes), and more preferably an anionic lipase and/or negatively charged lipase that degrades lipids (fats) and/or proteins found in urine (human urine). In certain aspects, the enzyme has a concentration ranging from 0.075 wt % to 0.25 wt %, more preferably from 0.1 wt % to 0.22 wt % of the overall concentration of the liquid composition in which any endpoint within these ranges can serve as endpoints for any additional sub-range falling therein to degrade lipids (fats) and/or proteins that may be found in urine (human urine).

In certain aspects, the microbial spore(s) and the enzyme comprise 10 wt % to 28 wt %, more preferably 12.5 wt % to 25 wt % of an overall weight of liquid composition in which any endpoint within these ranges can serve as endpoints for any additional sub-range falling therein.

The film forming composition included within the liquid composition is preferably configured to adhere to the substrate and/or to adhere the microbial spore(s) and the enzyme to the substrate. Moreover, the film forming composition has hydrophobic properties as well as hardness properties such that the film forming composition preferably forms a hydrophobic coating having sufficient hardness and durability post-application and/or post-cure/post-drying of the disclosed liquid composition onto a substrate. In certain aspects, the film forming composition is anionic, non-ionic, or a combination thereof and/or wherein the film forming composition comprises 8 wt % to 40 wt %, more preferably 10 wt % to 35 wt % of the overall concentration of the liquid composition in which any endpoint within these ranges can serve as endpoints for any additional sub-range falling therein. In certain aspects and to achieve the desired properties mentioned above, the film forming composition may be a two-part film forming composition that includes, for example, an anionic or non-ionic acrylate, an anionic or non-ionic silicon compound, or combinations thereof. In certain aspects, the two-part film forming composition includes an anionic or non-ionic acrylate and an anionic or non-ionic silicon compound, and in this aspect, the anionic or non-ionic acrylate is present at greater concentrations within the liquid composition than the anionic or non-ionic silicon compound.

The anionic or non-ionic acrylate is preferably configured to act as a binder system that, post-application of the liquid composition to a substrate, adheres (e.g., homogeneously and/or evenly and/or uniformly adheres) to the substrate and/or that adheres the microbial spore(s) and the enzyme to the substrate. In certain aspects, the anionic or non-ionic acrylate is an acrylic homopolymer configured to act as a binder system that adheres (e.g., homogeneously and/or evenly and/or uniformly adheres) to the substrate and/or that adheres the microbial spore(s) and the enzyme to the substrate. The anionic or non-ionic acrylate, more preferably an anionic acrylate, and even more preferably an acrylic homopolymer (anionic acrylic homopolymer) is present in the liquid composition at a concentration ranging from 7.5 wt % to 37 wt %, more preferably 9.75 wt % to 33.5 wt % of the overall concentration of the liquid composition in which any endpoint within these ranges can serve as endpoints for any additional sub-range falling therein. In certain aspects, concentrations of less than 7.5 wt % anionic or non-ionic acrylate of the overall concentration of the liquid composition are not used because film formation as well as adherence of the microbial spore(s)/enzyme is adversely affected when applied to the substrate resulting in an inferior, undesired coating/film. Conversely, if 37 wt % of anionic or non-ionic acrylate of the overall concentration of the liquid composition is exceeded, film formation is negatively affected as well because the film becomes too glossy (aesthetically displeasing) and thick, which affects microbial spore(s)/enzyme activity and dispersibility within the film as well as film hydrophobicity provided/imparted by the anionic or non-ionic silicon compound within the film forming composition. In certain aspects, cationic acrylates are not included within the liquid compositions as they may adversely impact enzyme activity and/or microbial spore efficacy.

The film forming composition and the film formed therefrom are preferably hydrophobic. To achieve the desired hydrophobicity, the film forming composition further includes a silicon compound, more preferably an anionic or non-ionic silicon compound therein. In certain aspects, the anionic or non-ionic silicon compound is an organosilicon compound. In certain aspects, the organosilicon compound is a non-ionic organosilicon compound. In certain aspects, the anionic or non-ionic silicon compound, more preferably an anionic or non-ionic organosilicon compound, even more preferably a non-ionic organosilicon compound is present in the liquid composition at a concentration ranging from 0.1 wt % to 3 wt %, more preferably 0.125 wt % to 2 wt % of the overall concentration of the liquid composition in which any endpoint within these ranges can serve as endpoints for any additional sub-range falling therein.

In certain aspects, the film forming composition comprises the anionic or non-ionic acrylate and the anionic or non-ionic silicon compound present in the liquid composition at ratio of 5:1 to 14:1, more preferably 4:1 to 7:1 relative to one another in which any endpoint within these ratio ranges can serve as endpoints for any additional sub-range falling therein. In certain aspects, the film forming composition comprises the anionic acrylate and the anionic silicon compound present in the liquid composition at ratio of 5:1 to 14:1, more preferably 4:1 to 7:1 relative to one another in which any endpoint within these ratio ranges can serve as endpoints for any additional sub-range falling therein. In certain aspects, the film forming composition comprises the anionic acrylate and the non-ionic silicon compound present in the liquid composition at ratio of 5:1 to 14:1, more preferably 4:1 to 7:1 relative to one another in which any endpoint within these ratio ranges can serve as endpoints for any additional sub-range falling therein. In certain aspects, the film forming composition comprises the non-ionic acrylate and the non-ionic silicon compound present in the liquid composition at ratio of 5:1 to 14:1, more preferably 4:1 to 7:1 relative to one another in which any endpoint within these ratio ranges can serve as endpoints for any additional sub-range falling therein. In certain aspects, when the anionic or non-ionic acrylate ratio falls below 5:1 to anionic or non-ionic silicon compound, film formation as well as adherence of the microbial spore(s)/enzyme is adversely affected when applied to the substrate. Conversely, when the anionic or non-ionic acrylate ratio exceeds 14:1 to anionic or non-ionic silicon compound film, film formation is negatively affected as well because the film becomes too glossy (aesthetically displeasing) and thick, which affects microbial spore(s)/enzyme activity and dispersibility within the film as well as film hydrophobicity provided/imparted by the anionic or non-ionic silicon compound within the film forming composition.

If the upper concentration endpoints and/or upper ratio endpoints of the anionic or non-ionic acrylate disclosed herein are exceeded relative to the anionic or non-ionic silicon compound in the liquid composition that forms a residual hydrophobic coating, durability and/or hydrophobicity of the resulting coating (post-application and/or post-drying/curing of the liquid composition) will be compromised, thus resulting in a sub-optimal, short-lived coating having sub-optimal hydrophobic properties.

In certain aspects, the film forming composition(s) disclosed herein have difficulty forming films and/or uniform and/or homogeneous films at ambient temperatures often requiring additional heat and/or a heating step to form films. In view of the need to form a film/coating post-application of the disclosed liquid composition on a substrate at ambient temperature(s), this problem was addressed, and coalescing agent(s) were identified that advantageously lowered the glass transition temperature(s) (Tg) of the film forming compositions and/or the disclosed liquid composition thereby allowing for film formation/coating formation at ambient temperature. Thus, in certain aspects, the liquid composition further includes a coalescing agent present in an effective amount to lower Tg of the film forming composition to facilitate film formation post-application of the liquid composition on the substrate at ambient temperature.

In certain aspects, the coalescing agent lowers the Tg of the liquid compositions and/or of the film forming agents by 10° C. to 25° C., more preferably from 15° C. to 20° C. when compared to the initial Tg of the liquid composition and/or of the film forming agents (without the coalescing agent therein), thereby allowing the liquid compositions to be applied and form films/coatings disclosed herein at ambient temperatures ranging from 20° C. to 25° C. The coalescing agent is an ester alcohol, a glycol ester, or a combination thereof, and in certain aspects, the coalescing agent is 2,2,4-Trinethyl-1,3-pentanediol-iso-butyrate. The coalescing agent has a concentration ranging from 0.15 wt % to 1.0 wt %, more preferably from 0.25 wt % to 0.95 wt % of an overall concentration of the liquid composition in which any endpoint within these ranges can serve as endpoints for any additional sub-range falling therein. In certain aspects, concentrations of less than 0.15 wt % of the coalescing agent of the overall concentration of the liquid composition are not used because film formation is adversely affected such that film formation does not and/or does not adequately occur at ambient temperature. Conversely, if 1.0 wt % of the coalescing agent of the overall concentration of the liquid composition is exceeded, film formation is negatively affected as well because the film is plasticized becoming too thick and/or opaque thereby having an aesthetically displeasing appearance, which further affects microbial spore(s)/enzyme activity and dispersibility within the film.

In certain aspects, additional fragrances and odor counteractants may be included in the liquid compositions at concentrations of up to 6.5 wt % of an overall weight of liquid composition in which any endpoint within these ranges can serve as endpoints for any additional sub-range falling therein. These fragrances may include, but are not limited to, one or more aromatic compounds. These odor counteractants may include, but are not limited to, benzaldehyde, bourgeonal, cinnamaldehyde, hexyl cinnamaldehyde, citronellal, hydroxy citronella, citral, cuminaldehyde, decanal, eugenol, geraniol, heptanal, cis-3-hexen-1-ol, hexanal, α-ionone, β-ionone, γ-ionone, lyral, nonanaldehyde, octanaldehyde, valeraldehyde, perillaldehyde, piperanal, vanillin, para tert-amyl cyclohexanone, ortho tert-butyl cyclohexanol, 3-cyclohexene-1-carboxaldehyde-4-(4-hydroxy-4-methylpentyl), α-methyl-4-(1-methylethyl) benzenepropanal, para tert-butyl-α-methyldihydrocinnamic aldehyde, and 4-tert-butyl cyclohexanol.

Also disclosed herein is an application method that includes (a) applying the liquid composition(s) disclosed herein to a substrate/surface disclosed herein and (b) forming a residual hydrophobic coating on the substrate post-application of the liquid composition. The residual hydrophobic coating is formed by drying and/or curing the liquid composition on the substrate, preferably at ambient temperature. Once the residual hydrophobic is formed on the substrate, the residual hydrophobic coating neutralizes urine odor and/or degrades urine when contacted with urine for prolonged periods of time.

Residual Hydrophobic Coating that Neutralizes Urine Odor and/or Degrades Urine

Also disclosed is a residual hydrophobic coating that neutralizes urine odor (human urine odor) and/or degrades urine (human urine) comprising: (a) microbial spore(s) and an enzyme present in an effective amount to reduce and/or eliminate urine odor and/or degrade urine when the residual hydrophobic coating is contacted with urine; and (b) a clear film having the microbial spore(s) and the enzyme composition dispersed, preferably homogeneously dispersed, therein. The residual hydrophobic coating is formed on the substrate post-application and drying/curing of the liquid composition on the substrate and includes less than 36 wt % water, more preferably less than 30 wt % water of the overall concentration of the residual hydrophobic coating post-drying/post-cure. In certain aspects, the substrate is a non-functionalized substrate, an electrostatically neutral substrate, a positively charged substrate, or a combination thereof in which the coating is physically bonded/bound to the substrate by Van der Waals forces(s) and/or by hydrogen bonding and/or is covalently bound to the substrate and has an overall thickness (preferably uniform or substantially uniform thickness) ranging from 0.5 μm to 250 μm, more preferably 0.5 μm to 75 μm, more preferably 0.5 μm to 25 μm with any additional endpoint falling within this broad range serving as endpoints for any additional sub-range thicknesses occurring therein. In preferred embodiments, the residual hydrophobic coating has a uniform (and/or substantially uniform) and/or even thickness (and/or substantially even thickness) (e.g., when viewed in cross-section) and/or is uniformly applied along a surface (outer surface) of the substrate along with the microbial spore(s) and/or enzyme dispersed, preferably homogeneously dispersed, within and/or throughout the residual hydrophobic coating.

The residual hydrophobic coating preferably exhibits hydrophobic and/or water repellant properties such that the coating remains substantially intact and operable over prolonged periods of time ranging from 1 day to 14 days post-application/post-formation and even after frequent and/or repeated applications of conventional cleaning products thereon. Conventional cleaning products include, but are not limited to, water-based cleaners such as Formula 409® that include quaternary ammonium actives/biocidals.

Post-application and post-drying/curing of the liquid composition, the film forming composition of the liquid composition forms a clear film in the residual hydrophobic coating, in which the clear film is anionic, non-ionic, or a combination thereof. The clear film comprises 12.0 wt % to 60.0 wt % of an overall concentration of the residual hydrophobic coating in which any endpoint within these ranges can serve as endpoints for any additional sub-range falling therein.

To obtain desired coating durability and/or hydrophobicity, in certain aspects, the clear film comprises a two-part or two-component system (film forming composition within the above-mentioned liquid composition) comprising an anionic or non-ionic acrylate, an anionic or non-ionic silicon compound, or a combination thereof. The anionic or non-ionic acrylate is an acrylic homopolymer, more preferably an anionic acrylic homopolymer. The anionic or non-ionic acrylate, more preferably an anionic or non-ionic acrylic homopolymer, even more preferably an anionic acrylic homopolymer is at a concentration ranging from 12.5 wt % to 55.0 wt % of the overall concentration of the residual hydrophobic coating in which any endpoint within these ranges can serve as endpoints for any additional sub-range falling therein. The anionic or non-ionic acrylate, more preferably an anionic or non-ionic acrylic homopolymer, even more preferably an anionic acrylic homopolymer is a binder system that adheres (e.g., homogeneously and/or evenly and/or uniformly adheres) to the substrate and/or that adheres the microbial spore(s) and the enzyme disclosed herein to the substrate. In certain aspects, concentrations of less than 12.5 wt % anionic or non-ionic acrylate, more preferably an anionic or non-ionic acrylic homopolymer, even more preferably an anionic acrylic homopolymer of the overall concentration of the residual hydrophobic coating are not used because film formation as well as adherence of the microbial spore(s)/enzyme is adversely affected (non-uniform and heterogeneous film formation and/or non-uniform and/or heterogeneous dispersion of the microbial spore(s) and/or enzyme therein). Conversely, if 55.0 wt % of anionic or non-ionic acrylate, more preferably an anionic or non-ionic acrylic homopolymer, even more preferably an anionic acrylic homopolymer if the overall concentration of the residual hydrophobic coating is exceeded, film formation is negatively affected as well because the resulting film is too glossy (aesthetically displeasing) and thick, which affects microbial spore(s)/enzyme activity and dispersibility within the film as well as film hydrophobicity provided/imparted by the anionic or non-ionic silicon compound.

To further obtain desired coating durability and/or hydrophobicity, the clear film composition (as well as the coating) and more particularly two-part or two-component system disclosed above further includes an anionic or non-ionic silicon compound. In certain aspects, the anionic or non-ionic silicon compound is an organosilicon compound and even more preferably is a non-ionic organosilicon compound. The anionic or non-ionic silicon compound, more preferably an organosilicon compound, and even more preferably the non-ionic organosilicon compound is present at a concentration ranging from 0.4 wt % to 5.0 wt %, more preferably 0.4 wt % to 4.6 wt % of the overall concentration of the residual hydrophobic coating in which any endpoint within these ranges can serve as endpoints for any additional sub-range falling therein.

In certain aspects, the residual hydrophobic coating includes the anionic or non-ionic acrylate and the anionic or non-ionic silicon compound at ratio of 5:1 to 14:1, more preferably 4:1 to 7:1 relative to one another in which any endpoint within these ratio ranges can serve as endpoints for any additional sub-range falling therein. In certain aspects, the residual hydrophobic coating includes the anionic acrylate and the anionic silicon compound at ratio of 5:1 to 14:1, more preferably 4:1 to 7:1 relative to one another in which any endpoint within these ratio ranges can serve as endpoints for any additional sub-range falling therein. In certain aspects, the residual hydrophobic coating includes the anionic acrylate and the non-ionic silicon compound at ratio of 5:1 to 14:1, more preferably 4:1 to 7:1 relative to one another in which any endpoint within these ratio ranges can serve as endpoints for any additional sub-range falling therein. In certain aspects, the residual hydrophobic coating includes the non-ionic acrylate and the non-ionic silicon compound at ratio of 5:1 to 14:1, more preferably 4:1 to 7:1 relative to one another in which any endpoint within these ratio ranges can serve as endpoints for any additional sub-range falling therein. In certain aspects, when the anionic or non-ionic acrylate ratio falls below 5:1 to anionic or non-ionic silicon compound, film formation as well as adherence of the microbial spore(s)/enzyme is adversely affected when applied to and/or drying/curing on the substrate. Conversely, when the anionic or non-ionic acrylate ratio exceeds 14:1 to anionic or non-ionic silicon compound, film formation is negatively affected as well because the film becomes too glossy (aesthetically displeasing) and thick, which affects microbial spore(s)/enzyme activity and dispersion as well as film hydrophobicity of the hydrophobic residual coating.

As alluded to above, the microbial spore(s) and enzyme are present in the hydrophobic residual coating at an effective amount to reduce and/or eliminate urine odor and/or degrade urine when the residual hydrophobic coating is contacted with urine for prolonged time periods, which range from 1 day to 14 days, preferably 1 day to 5 days. In certain aspects, the microbial spore(s) and/or enzyme are dispersed, preferably homogeneously dispersed, throughout the residual hydrophobic coating including being dispersed, preferably homogeneously dispersed, throughout the clear film in the residual hydrophobic coating.

The microbial spore(s) disclosed herein are preferably gram-positive bacterial spore and/or non-pathogenic microbial spores, more preferably *Bacillus* spores, and even more preferably *Bacillus subtilis* spores that degrade urine. In certain aspects, the non-pathogenic microbial spores, more preferably *Bacillus* spores, more preferably *Bacillus subtilis* spores are non-genetically modified spores while in other aspects the *Bacillus* spores are genetically modified with transgenes that advantageously degrade urine and/or neutralize the smells associated with urine and/or the by-products (ammonia and/or bicarbonate) thereof and/or additional substances (e.g., lipids and/or proteins) found within and/or excreted with urine. The microbial spore(s), and more particularly, *Bacillus* spores, are present in the hydrophobic residual coating at a concentration of $2.5\times10^7$ to $7.5\times10^7$, more preferably $3\times10^7$ to $6.75\times10^7$ cfu/mL in which any endpoint within these ranges can serve as endpoints for any additional sub-range falling therein to advantageously achieve the desired urine degradation and/or neutralization and/or by-product degradation/neutralization (ammonia and/or bicarbonate) and/or degradation/neutralization of additional substances (e.g., lipids and/or proteins) for a desired period of time by the coating.

The enzyme included within the residual hydrophobic coating preferably degrades lipids (fats) and/or proteins typically found in urine (human urine) and is included within the residual hydrophobic coating at effective amounts/concentrations to do so. In certain aspects, the enzyme is an anionic enzyme because in order to interact with other components in the liquid composition and to maintain efficacy both within the liquid composition and post-application of the liquid composition onto a substrate. The enzyme is preferably a lipase (more preferably a bacterial lipase or a lipase produced by (and/or isolated from) bacterial fermentation processes), and more preferably an anionic lipase and/or negatively charged lipase that degrades lipids (fats) and/or proteins found in urine (human urine). In certain aspects, the enzyme has a concentration ranging from 0.5 wt % to 5.0 wt %, more preferably from 1.0 wt % to 4.5 wt %, more preferably 1.25 wt % to 4.0 wt % of the overall concentration of the residual hydrophobic coating in which any endpoint within these ranges can serve as endpoints for any additional sub-range falling therein, to degrade lipids (fats) and/or proteins that may be found in urine (human urine).

In certain aspects, the microbial spore(s) and the enzyme comprise 42.0 wt % to 83 wt % of an overall weight of residual hydrophobic coating in which any endpoint within these ranges can serve as endpoints for any additional sub-range falling therein.

A coalescing agent is further included within the hydrophobic residual coating. During coating formation, the coalescing agent lowers Tg of the liquid compositions and/or of the film forming agents disclosed herein thereby advantageously allowing for drying/curing and film formation of the hydrophobic residual coating at ambient temperature(s). The coalescing agent is an ester alcohol, a glycol ester, or a combination thereof, and in certain aspects, the coalescing agent is 2,2,4-Trimethyl-1,3-pentanediol-iso-butyrate. The coalescing agent has a concentration ranging from 0.4 wt % to 5.0 wt %, preferably from 0.5 wt % to 4.75 wt %, more preferably from 1 wt % to 4.5 wt %, of an overall concentration of the hydrophobic residual coating in which any endpoint within these ranges can serve as endpoints for any additional sub-range falling therein.

Coated Articles/Surfaces

Also disclosed is an article comprising: (a) a substrate; and (b) the residual hydrophobic coating disclosed herein that neutralizes urine odor and/or degrades urine on the substrate. In certain aspects, wherein the substrate is a rigid substrate, a non-porous substrate, or a combination thereof. Moreover, the substrate is glass, ceramic, metal, plastic, cementitious fillers (e.g., grout), elastomer(s) (e.g., elastomeric caulk), or any combination thereof. The substrate includes toilets, sinks, flooring/flooring surfaces, wall and/or backsplash tile(s), and/or any combination thereof made from any one of the aforementioned materials. In certain aspects, the substrate is a non-functionalized substrate, an electrostatically neutral substrate, a positively charged substrate, or a combination thereof in which the coating is physically bonded/bound to the substrate by Van der Waals forces(s) and/or by hydrogen bonding and/or is covalently bound to the substrate and has an overall thickness (preferably uniform or substantially uniform thickness) ranging from 0.5 μm to 250 μm, more preferably 0.5 μm to 75 μm, more preferably 0.5 μm to 25 μm, with any additional endpoint falling within this broad range serving as endpoints for any additional sub-range thicknesses occurring therein. In preferred embodiments, the residual hydrophobic coating has a uniform (and/or substantially uniform) and/or even thickness (and/or substantially even thickness) (e.g., when viewed in cross-section) along with the microbial spore(s) and/or enzyme dispersed, preferably homogeneously dispersed, within and/or throughout the residual hydrophobic coating.

The residual hydrophobic coating of the coated article preferably exhibits hydrophobic and/or water repellant properties such that the coating remains substantially intact and operable over prolonged periods of time ranging from 1 day to 14 days post-application/post-formation and even after frequent and/or repeated applications of conventional cleaning products thereon. Conventional cleaning products include, but are not limited to, water-based cleaners such as Formula 409® that include quaternary ammonium actives/biocidals.

Working Examples

Table 1 discloses a liquid composition (i.e., the residual bathroom deodorizer composition as disclosed herein) and ranges of the components in the liquid composition pre-application to the substrate.

The anionic acrylic homopolymer emulsion, sourced from Gellner Industrial LLC (Ottopol SF-45 Technical Data Sheet, incorporated by reference herein, having an amount of anionic acrylic homopolymer of approximately 45 wt %), is included within the liquid composition(s) as an anionic acrylate of the film forming composition under (c) in the concentrations shown in Table 1. The 40% Organo-Modified Silicone Emulsion, sourced from Momentive (CoatOSil™ Clean Technical Data Sheet (2022) incorporated by reference herein), is included within the liquid composition(s) as an anionic silicon compound of the film forming composition under (c) in the concentrations shown in Table 1. The odor counteractant, sourced from Belle Aire Creations (Ordenone Specification Sheet (2024) incorporated by reference herein), is included within the liquid composition(s) as an additional component in the concentrations shown in Table 1. The microbial/enzyme blend, sourced from Barentz (J-Zyme® Multi Spore Floor Cleaner 5×FF, Technical Data Sheet (2021) incorporated by reference herein), is included within the liquid composition(s) as component (b) in the concentrations shown in Table 1. The microbial/enzyme blend has $2.70\times10^{7}$ cfu/mL of bacteria. The ester alcohol sourced from Eastman (Eastman Texanol™ Ester Alcohol (CAS No. 25265-77-4) Product Data Sheet (2013) incorporated by reference herein), is included within the liquid composition(s) as a coalescing agent in the concentrations shown in Table 1. Water may be further included in the liquid composition in the concentrations disclosed in Table 1. The Fresh Breeze Scent sourced from Belle Aire® Creations (Fresh Breeze Type Specification Sheet #270347 (Dec. 5, 2024) incorporated by reference herein), is included within the liquid composition(s) as an additional component in the concentrations shown in Table 1.

TABLE 1

| Components of Composition | Liquid Composition (wt %) |
|---|---|
| Anionic Acrylic Homopolymer Emulsion | 10.0-30.0 |
| 40% Organo-Modified Silicone Emulsion | 0.5-2.0 |
| Odor Counteractant | 0.0-5.0 |
| Microbial/Enzyme Blend | 12.0-24.0 |
| Ester Alcohol/Coalescing Agent | 0.2-0.8 |
| Water | 36.0-81.0 |
| Fresh Breeze Scent | 0-1.0 |
| Total | 100 |

Table 2 discloses the Comparative Examples (i.e., abbreviated “Comp #1”, “Comp #2”, “Comp #3”, and “Comp #4”) and Example (i.e., abbreviated “Ex. #1”) including the concentrations of each component. As shown in Table 2, the Comp. #4 lacks the microbial/enzyme blend (J-Zyme®) when compared to the Ex. #1 and Comparative Examples “Comp #1”, “Comp #2”, and “Comp #3”. The POLYPEARL 10 micron sourced from Coating Products OHZ (POLYPEARL™ ME SERIES Technical Data Sheet (2023) incorporated by reference herein), is a white, free-flowing powder of polymethylsilsesquioxane (PMSQ) particles (CAS-No: 68554-70-1) and this is included within the liquid composition(s) in the concentrations shown in Table 2. POLYPEARL 10 micron was added to increase hydrophobicity and stain reducing properties. While the POLYPEARL 10 micron did increase the durability of the coating, the urine was absorbed by the POLYPEARL 10 micron in the coating which led to increased staining and delta E values.

TABLE 2

| Components of the Composition | Comp #1 (wt %) | Comp #2 (wt %) | Comp #3 (wt %) | Comp #4 (wt %) | Ex. #1 (wt %) |
|---|---|---|---|---|---|
| 45% Anionic Acrylic Homopolymer Emulsion | 24 | 24 | 24 | 24 | 12 |
| Amount of Anionic Acrylic Homopolymer | 10.8 | 10.8 | 10.8 | 10.8 | 5.4 |
| 40% Organo-Modified Silicone Emulsion | 0.5 | 0.5 | 0.5 | 0.5 | 1 |
| Amount of Anionic Silicone Compound | 0.2 | 0.2 | 0.2 | 0.2 | 0.4 |
| Ratio of Acrylic Homopolymer to Silicon Compound | 54:1 | 54:1 | 54:1 | 54:1 | 13.5:1 |
| POLYPEARL 10 micron | 0 | 0 | 3 | 0 | 0 |
| Odor Counteractant | 2 | 2 | 2 | 2 | 2 |
| Microbial/Enzyme Blend | 12 | 3 | 3 | 0 | 12 |
| Ester Alcohol | 0.6 | 0.6 | 0.6 | 0.6 | 0.3 |
| Water | 59.9 | 68.9 | 65.9 | 71.9 | 71.7 |
| Fresh Breeze Scent | 1.0 | 1.0 | 1.0 | 1.0 | 1.0 |
| Total | 100 | 100 | 100 | 100 | 100 |

The Comparative Examples and Example disclosed in Table 2 were tested to obtain the Delta E values as shown in Table 3. The Delta E values are measured from 0 to 100 and represent the difference between two colors or the amount of change a specific color has undergone, thus quantitating the appearance of stains on a surface. Less color difference or change is observed when the value is closer to 0. Thus, the presence of stains will cause the value to increase, while the absence or removal of stains will cause the value to decrease. As shown in Table 3, Ex. #1 has the best stain reducing properties with a Delta E value of 1.3. The Comparative Example “Comp #3” has the worst stain reducing properties with a Delta E value of 4.54.

When comparing the compositions, as shown in Table 2, Ex. 1 and Comp. #4 include more water in their composition compared to the other Comparative Examples. However, Ex. #1 includes 12% of the acrylic emulsion and 12% of the microbial/enzyme blend while Comp. #4 includes 24% of the acrylic emulsion and 0% of the microbial/enzyme blend. It appears there is a relationship between the respective amounts of the acrylic emulsion and microbial/enzyme blend. This may be due to the hydrophobic nature of the acrylic emulsion which allows it to reduce stains without the microbial/enzyme blend. Thus, although Comp. #4 does not include the microbial/enzyme blend, the increased concentration of the acrylic emulsion (i.e., increased hydrophobicity) in the coating prevents the formation of water-based stains.

TABLE 3

| | Comp #1 | Comp #2 | Comp #3 | Comp #4 | Ex. #1 |
|---|---|---|---|---|---|
| Delta E | 2.07 | 2.23 | 4.54 | 1.71 | 1.30 |

Ex. #1 and Comparative Example “Comp #3” were applied to the substrate (i.e., subway tile/porcelain tile). These substrates, along with an untreated substrate, were tested for the presence of odor throughout 10 individual tests (i.e., T #1-T #10), as shown in Table 4. The odor was ranked from 1 to 3 (i.e., 1 represents the minimum amount of odor; 3 represents the maximum amount of odor). The untreated substrate exhibited the highest score with an average of 2.5.

The Ex. #1 and Comparative Example "Comp #3" exhibited similar scores, 1.8 and 1.7, respectively.

TABLE 4

| Composition | Score (1 = Minimum; 3 = Maximum) | | | | | | | | | | |
|---|---|---|---|---|---|---|---|---|---|---|---|
| | T#1 | T#2 | T#3 | T#4 | T#5 | T#6 | T#7 | T#8 | T#9 | T#10 | Avg |
| No Composition | 3 | 3 | 1 | 2 | 3 | 1 | 3 | 3 | 3 | 3 | 2.5 |
| Ex. #1 | 2 | 1 | 3 | 1 | 1 | 3 | 2 | 1 | 2 | 2 | 1.8 |
| Comp #3 | 1 | 2 | 2 | 3 | 2 | 2 | 1 | 2 | 1 | 1 | 1.7 |

Figure 2:
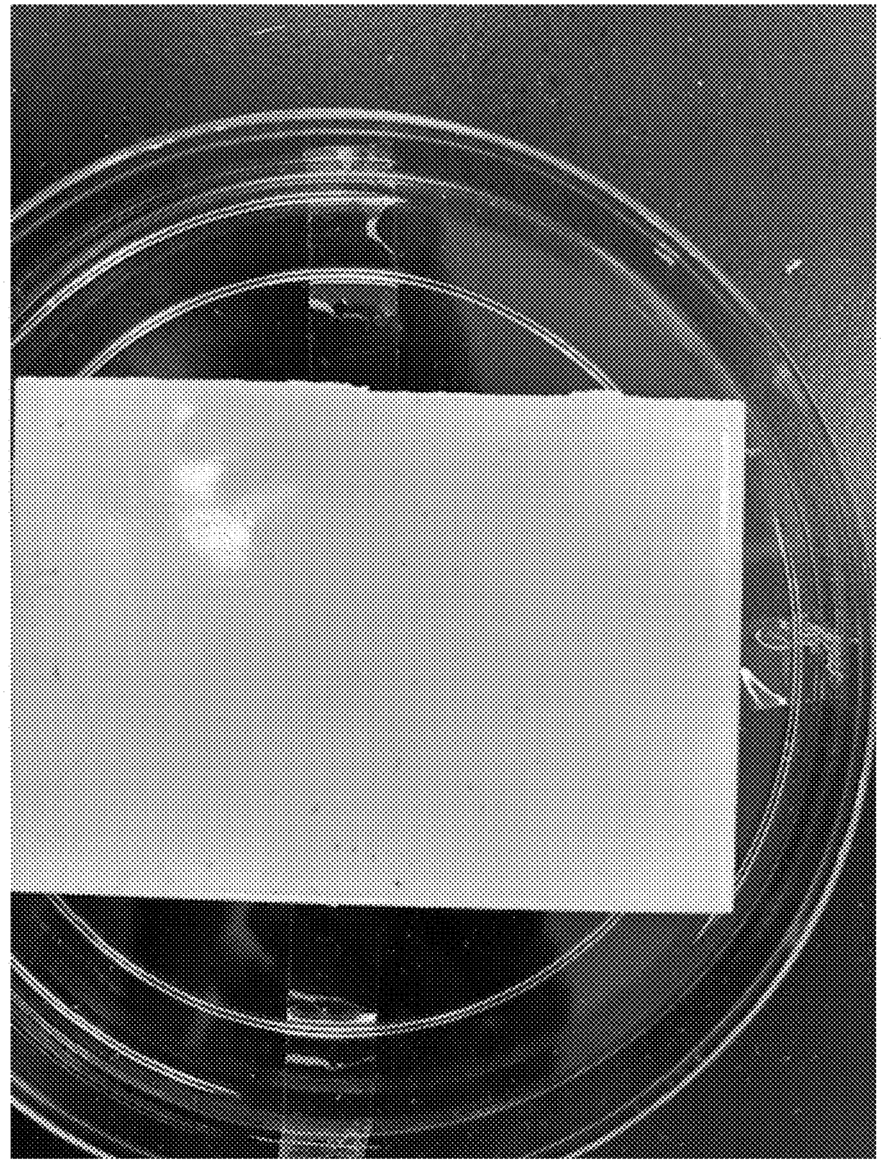
FIG. 2 is a photograph of a porcelain substrate soiled with urine twenty-four (24) hours post-treatment with an exemplary liquid composition (post-drying/post-curing thereon).

FIG. 1 and FIG. 2 demonstrate stain reducing efficacy and urine degradation properties of Ex. #1 compared to an untreated control. In particular, FIG. 1 is a photograph of the untreated substrate (i.e., porcelain tile) soiled with urine. The photograph in FIG. 1 was taken 24 hours after urine dried on the substrate. FIG. 2 is a photograph of the substrate (i.e., porcelain tile) that was soiled with urine (i.e., having urine dried thereon similar to FIG. 1) and then subsequently treated with Ex. #1. The composition was applied via a mist/aerosol forming a coating on the substrate post-drying/post-cure. The substrate was allowed to cure for 24 hours. As shown in FIG. 2 and when compared with FIG. 1, Ex. #1 clearly reduced and/or degraded the urine and/or staining associated with urine after 24 hours compared to the untreated substrate.

TABLE 5

| Components of the Composition | Ex. 1' (wt %) | Comp #5 (wt %) | Comp #6 (wt %) | Comp #7 (wt %) |
|---|---|---|---|---|
| 45% Anionic Acrylic Homopolymer Emulsion | 12 | 24 | 24 | 24 |
| Amount of Anionic Acrylic Homopolymer | 5.4 | 10.8 | 10.8 | 10.8 |
| 40% Organo-Modified Silicone Emulsion | 1 | 1 | 1 | 1 |
| Amount of Anionic Silicone Compound | 0.4 | 0.4 | 0.4 | 0.4 |
| Ratio of Acrylic Homopolymer to Silicon Compound | 12:1 | 24:1 | 24:1 | 24:1 |
| Odor Counteractant | 2 | 2 | 2 | 2 |
| Microbial/Enzyme Blend | 0 | 12 | 12 | 12 |
| Ester Alcohol | 0.3 | 0 | 3 | 0.1 |
| Water | 83.7 | 60 | 57 | 59.9 |
| Fresh Breeze Scent | 1.0 | 1.0 | 1.0 | 1.0 |
| Total | 100 | 100 | 100 | 100 |

Figure 3A:
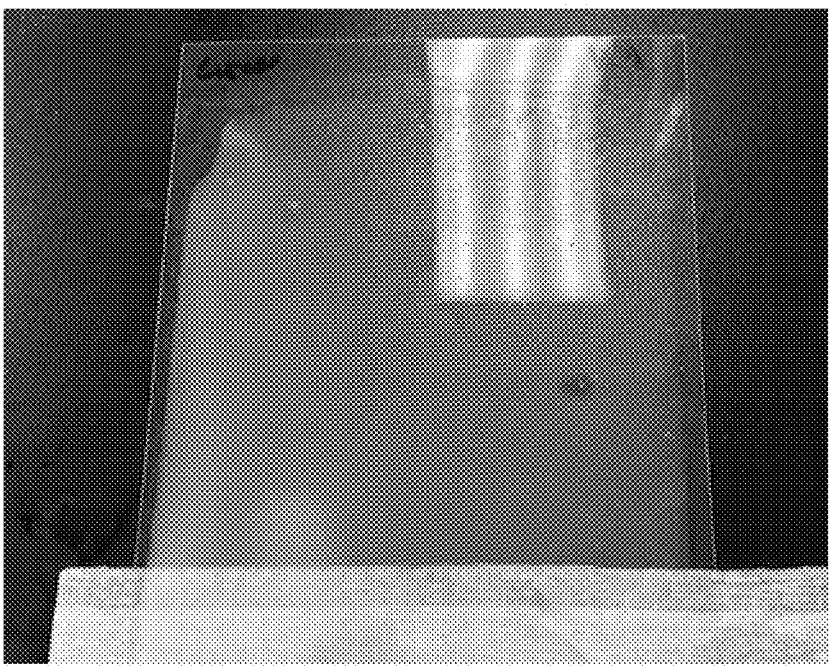
FIG. 3A and FIG. 3B are photographs of an exemplary liquid composition (post-drying/post-curing thereon) on a plastic substrate without the microbial/enzyme blend.
Figure 3B:
Figure 4A:
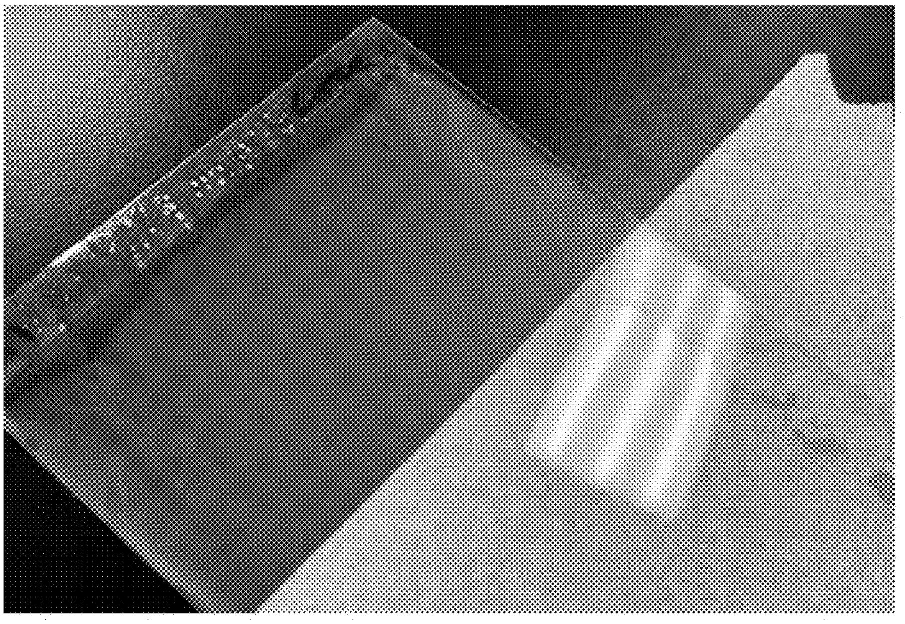
FIG. 4A and FIG. 4B are photographs of an exemplary liquid composition (post-drying/post-curing thereon) on a plastic substrate with the microbial/enzyme blend.
Figure 4B:
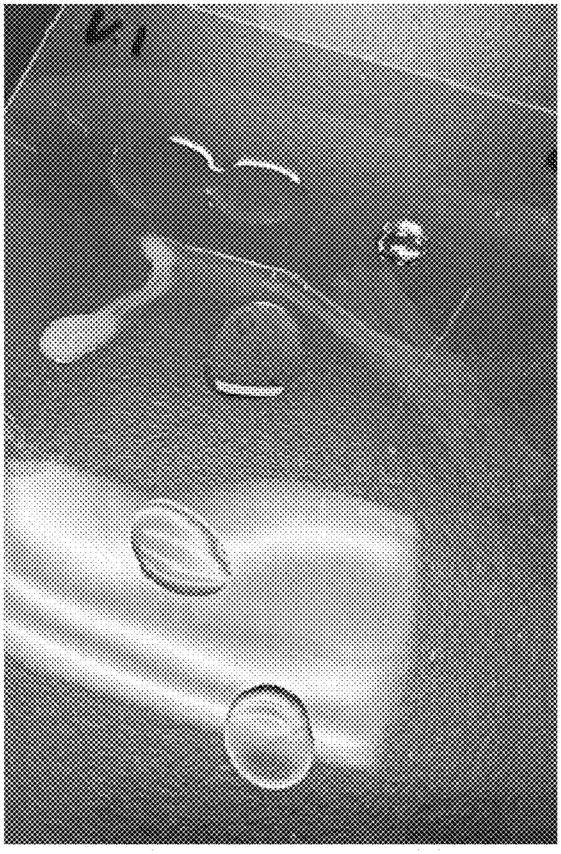

FIG. 3A and FIG. 3B are photographs of a liquid composition (Ex. 1'; post-drying/post-curing) on the surface of a plastic substrate. Ex. 1' is representative of the coating formed from Ex. 1 (as shown in Table 2 above) when applied to a substrate (i.e., the same concentrations of acrylic homopolymer, silicone compound, and coalescing agent). The liquid composition of Ex. 1' displayed good film formation and did not produce a blushing effect after the addition of water to the surface, as shown within FIG. 3A (homogeneous coating formed thereon) and FIG. 3B (no spotting or discoloration observed). Ex. 1' provided proof of concept that proper film formation and a transparent and homogeneous/uniform coating is obtained when utilizing the disclosed ranges of coalescing agent (as disclosed in Table 1 above). Similar liquid compositions (i.e., the same concentrations of acrylic homopolymer, silicone compound, and coalescing agent) containing the disclosed concentrations of microbial/enzyme blend (as disclosed in Table 1 above) were further tested and exhibited similar results, as shown in FIG. 4A and FIG. 4B, which show an exemplary liquid composition (Ex. 1; post-drying/post-curing) on the surface of a plastic substrate. The liquid composition of Ex. 1 (as disclosed in Table 2 above) displayed good film formation and did not produce a blushing effect after the addition of water to the surface, as shown within FIG. 4A (homogeneous coating formed thereon) and FIG. 4B (no spotting or discoloration observed).

Figure 5A:
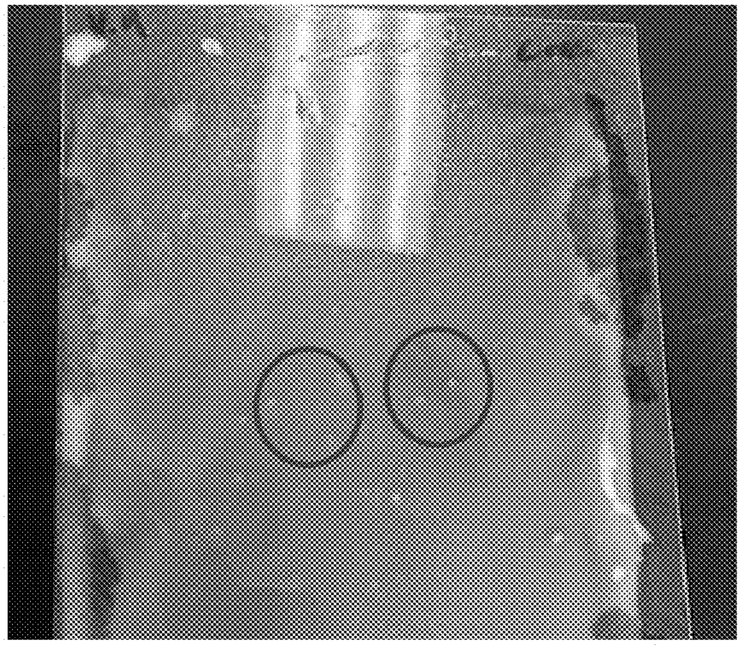
FIG. 5A and FIG. 5B are photographs of a comparative liquid composition (post-drying/post-curing thereon) on a plastic substrate.
Figure 5B:
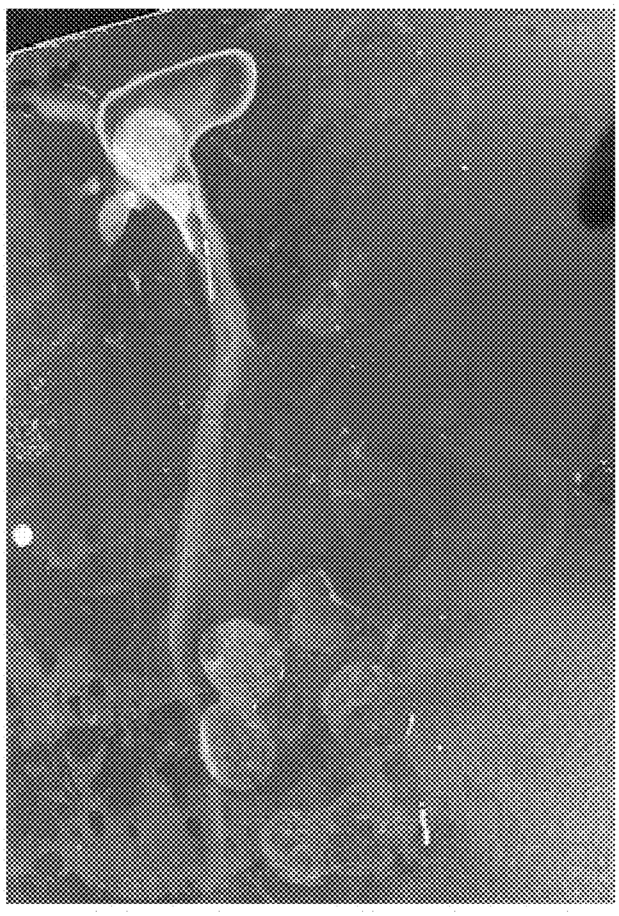
Figure 6A:
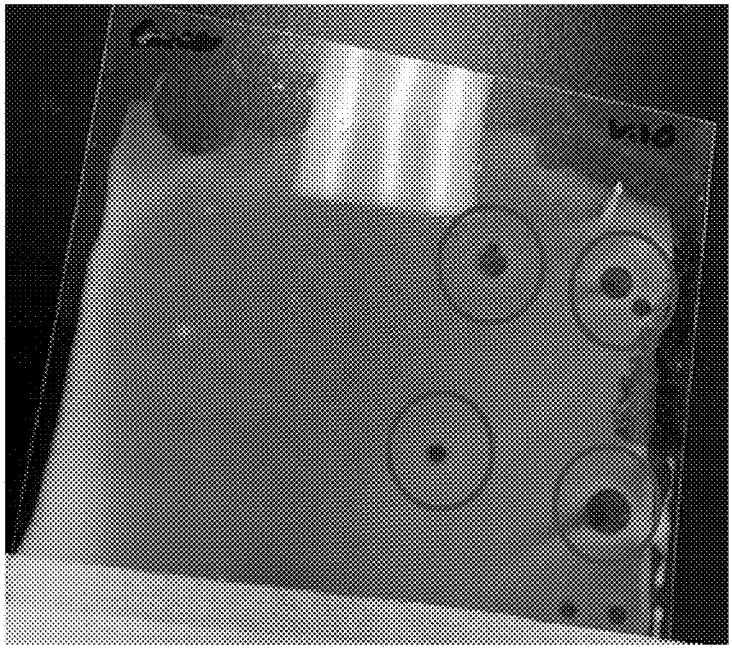
FIG. 6A and FIG. 6B are photographs of a comparative liquid composition (post-drying/post-curing thereon) on a plastic substrate.
Figure 6B:
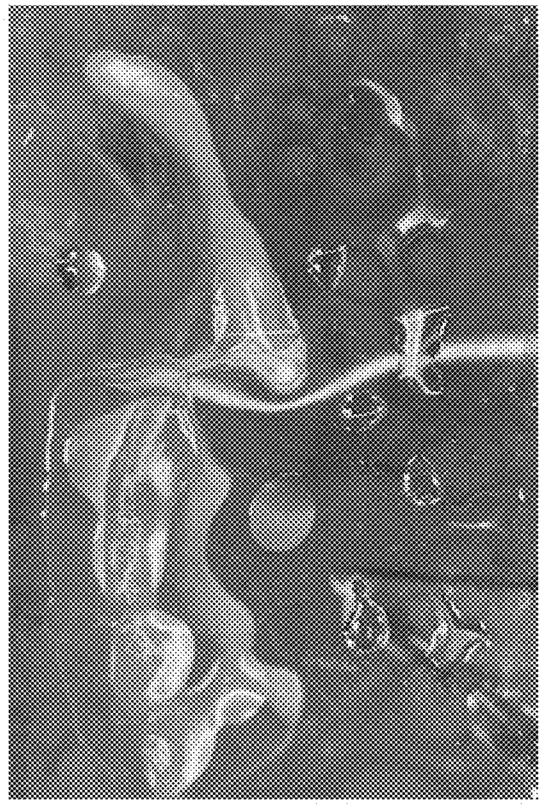
Figure 7A:
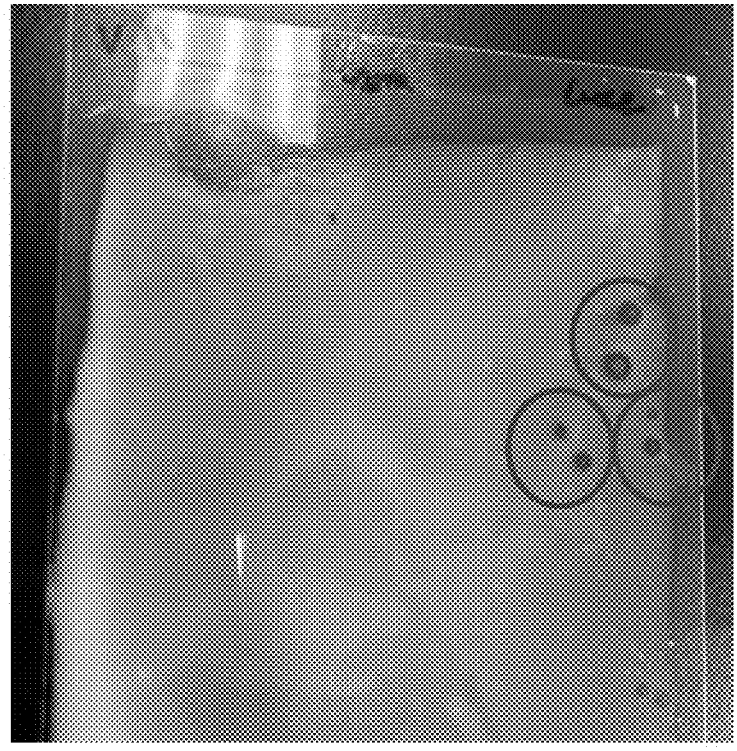
FIG. 7A and FIG. 7B are photographs of a comparative liquid composition (post-drying/post-curing thereon) on a plastic substrate.
Figure 7B:
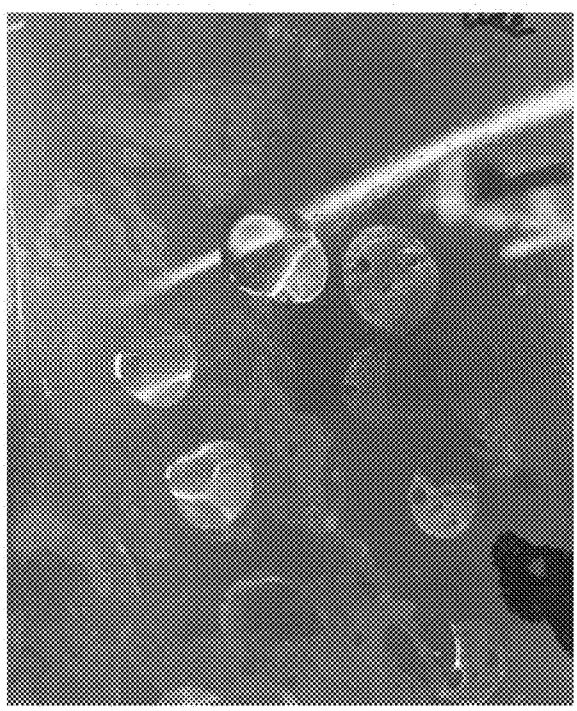

Additionally, FIG. 5A, FIG. 5B, FIG. 6A, FIG. 6B, FIG. 7A, and FIG. 7B are photographs of comparative (Comp #5-Comp #7; as shown in Table 5) liquid compositions (post-drying/post-curing) on the surface of a plastic substrate. The liquid composition (Comp #5) of FIG. 5A and FIG. 5B does not contain a coalescing agent. FIG. 5A showed decreased film formation (white spots) and increased heterogeneity and FIG. 5B showed blushing after the addition of water to the surface. Blushing occurs with decreased hydrophobicity which causes the surfactant to rise to the surface of the coating and create white marks on the surface of the coating, as shown in FIG. 5B. The liquid composition (Comp #6) of FIG. 6A and FIG. 6B contains a higher concentration of coalescing agent (i.e., higher than the exemplative range disclosed in Table 1). FIG. 6A showed poor film formation and increased heterogeneity due to the formation of dewets (circular spots) on the surface of the coating. FIG. 6B also showed blushing of the coating with the addition of water to the surface. The liquid composition (Comp #7) of FIG. 7A and FIG. 7B contains a lower concentration of coalescing agent (i.e., lower than the exemplative range disclosed in Table 1). FIG. 7A showed poor film formation and increased heterogeneity due to the formation of dewets (circular spots) on the surface of the coating. FIG. 6B also showed blushing of the coating with the addition of water to the surface.

The coalescing agent produces a uniform and homogeneous coating/film on the surface of the substrate. The coalescing agent also provides a sealing effect to the coating and/or film formed on the substrate. However, too much coalescing agent can have the opposite effect and lower the performance/produce an inferior coating/film. Thus, the coatings formed from liquid compositions, Comp #5-Comp #7, would display decreased durability compared to Ex. 1' discussed above.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

The invention claimed is:

1. A liquid composition that forms a residual hydrophobic coating on a substrate post-application that neutralizes urine odor and/or degrades urine when the residual hydrophobic coating is contacted with urine comprising:

(a) water at a concentration of up to 80 wt % of the liquid composition;

(b) microbial spore(s) and an enzyme homogeneously dispersed within the water present in an effective amount to reduce and/or eliminate urine odor and/or degrade urine on the substrate post-application;

(c) a film forming composition comprising at least 8 wt % of the overall concentration of the liquid composition, said film forming composition being homogeneously dispersed within the water present in an effective amount to form a clear hydrophobic film on the substrate post-application; and (d) a coalescing agent having a concentration ranging from 0.15 wt % to 1.0 wt % of the overall concentration of the liquid composition, wherein the coalescing agent is an ester alcohol, a glycol ester, or a combination thereof, the coalescing agent being present in an effective amount to lower Tg of the film forming composition to facilitate film formation post-application of the liquid composition on the substrate at ambient temperature.

2. The liquid composition of claim 1, wherein the liquid composition has pH ranging from 5.0 to 9.8 and a viscosity ranging from 5 cPs to 100 cPs measured at a temperature of 25° C. using ASTM D2196.

3. The liquid composition of claim 1, wherein the coalescing agent is 2,2,4-Trimethyl-1,3-pentanediol-iso-butyrate.

4. The liquid composition of claim 1, wherein the film forming composition is configured to adhere to the substrate and/or is configured to adhere the microbial spore(s) and the enzyme to the substrate.

5. The liquid composition of claim 1, wherein the film forming composition is anionic, non-ionic, or a combination thereof and/or wherein the film forming composition comprises 10 wt % to 35 wt % of the overall concentration of the liquid composition.

6. The liquid composition of claim 5, wherein the film forming composition comprises an anionic or non-ionic acrylate, an anionic or non-ionic silicon compound, or a combination thereof.

7. The liquid composition of claim 6, wherein the anionic or non-ionic acrylate is an acrylic homopolymer.

8. The liquid composition of claim 7, wherein the anionic or non-ionic acrylate is present in the liquid composition at a concentration ranging from 9.75 wt % to 33.5 wt % of the overall concentration of the liquid composition.

9. The liquid composition of claim 6, wherein the film forming composition comprises the anionic acrylate.

10. The liquid composition of claim 9, wherein the anionic acrylate is an anionic acrylic homopolymer.

11. The liquid composition of claim 10, wherein the anionic acrylate is present in the liquid composition at a concentration ranging from 9.75 wt % to 33.5 wt % of the overall concentration of the liquid composition.

12. The liquid composition of claim 6, wherein the film forming composition comprises an anionic or non-ionic silicon compound.

13. The liquid composition of claim 12, wherein the anionic or non-ionic silicon compound is present in the liquid composition at a concentration ranging from 0.125 wt % to 2 wt % of the overall concentration of the liquid composition.

14. The liquid composition of claim 13, wherein the anionic or non-ionic silicon compound is an organosilicon compound.

15. The liquid composition of claim 14, wherein the organosilicon compound is a non-ionic organosilicon compound.

16. The liquid composition of claim 6, wherein the film forming composition comprises the anionic or non-ionic acrylate and the anionic or non-ionic silicon compound present in the liquid composition at a ratio of 5:1 to 14:1 by weight.

17. The liquid composition of claim 6, wherein the film forming composition comprises the anionic acrylate and the anionic silicon compound present in the liquid composition at a ratio of 5:1 to 14:1 by weight.

18. The liquid composition of claim 6, wherein the film forming composition comprises the anionic acrylate and the non-ionic silicon compound present in the liquid composition at a ratio of 5:1 to 14:1 by weight.

19. The liquid composition of claim 6, wherein the film forming composition comprises the non-ionic acrylate and the non-ionic silicon compound present in the liquid composition at a ratio of 5:1 to 14:1 by weight.

20. The liquid composition of claim 1, wherein the microbial spore(s) are *Bacillus* spores that degrade urine.

21. The liquid composition of claim 20, wherein the microbial spore(s) are present at a concentration of $2.5 \times 10^7$ to $7.5 \times 10^7$ cfu/mL in the liquid composition.

22. The liquid composition of claim 1, wherein the enzyme is an anionic enzyme.

23. The liquid composition of claim 22, wherein the enzyme is a lipase, the enzyme having a concentration of at least 0.075 wt % of the overall concentration of the liquid composition, the lipase present at an effective amount to degrade urine and/or lipids within urine.

24. The liquid composition of claim 23, wherein the enzyme has a concentration ranging from 0.075 wt % to 0.25 wt % of the overall concentration of the liquid composition.

25. The liquid composition of claim 24, wherein the microbial spore(s) and the enzyme comprise 10 wt % to 28 wt % of an overall weight of liquid composition.

26. A method of making the liquid composition of claim 1 comprising dispersing the microbial spore(s), the enzyme, and the film forming composition in water and dispersing the coalescing agent therein thereby forming the liquid composition.

* * * * *